United States Patent
Tubic et al.

(10) Patent No.: US 10,966,450 B2
(45) Date of Patent: Apr. 6, 2021

(54) COATING OF FOOD PRODUCTS WITH A PARTICULATE COATING MATERIAL

(71) Applicant: MAREL FURTHER PROCESSING B.V., Boxmeer (NL)

(72) Inventors: Tihomir Tubic, Boxmeer (NL); Johannes Martinus Meulendijks, Deurne (NL); Stephanus Andreas Bouwman, Nijmegen (NL); Thomas Willem Dekker, Nijmegen (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 0 days.

(21) Appl. No.: 16/772,674

(22) PCT Filed: Dec. 20, 2018

(86) PCT No.: PCT/NL2018/050861
§ 371 (c)(1),
(2) Date: Jun. 12, 2020

(87) PCT Pub. No.: WO2019/125157
PCT Pub. Date: Jun. 27, 2019

(65) Prior Publication Data
US 2020/0305494 A1 Oct. 1, 2020

(30) Foreign Application Priority Data

Dec. 22, 2017 (NL) .................................. 2020164

(51) Int. Cl.
*A23P 20/13* (2016.01)
*A23G 3/26* (2006.01)
(Continued)

(52) U.S. Cl.
CPC ................. *A23P 20/13* (2016.08); *A23B 4/32* (2013.01); *A23G 3/26* (2013.01); *B05C 3/08* (2013.01); *B05C 19/04* (2013.01)

(58) Field of Classification Search
CPC ........ A23P 20/13; A23P 20/12; A23G 3/2076; A23G 3/26; A23B 4/32; B05C 19/04; B05C 3/08; A21C 9/04
(Continued)

(56) References Cited

U.S. PATENT DOCUMENTS 3,097,967 A 7/1963 Fries et al.
5,937,744 A 8/1999 Nothum, Sr. et al.
(Continued)

FOREIGN PATENT DOCUMENTS

EP 1658777 A1 5/2006
JP 2012016338 A 1/2012

OTHER PUBLICATIONS

Search Report from corresponding Dutch Application No. NL2020164, dated Aug. 27, 2018.
(Continued)

*Primary Examiner* — Laura Edwards
(74) *Attorney, Agent, or Firm* — Workman Nydegger (57) ABSTRACT

The invention relates to an in-line multi-mode coating machine adapted to coat food products with a particulate coating material, the machine comprising in-line with each other and in succession: an infeed conveyor assembly, a rotary tumbling drum, an elevator device and a discharge conveyor assembly. In a drum-mode, the rotary tumbling drum is adapted to be supplied with particulate coating material and to tumble the food products and particulate coating material together. In a conveyor-mode of the coating machine the infeed conveyor assembly and the discharge conveyor assembly are arranged to adjoin each other whilst
(Continued)

extending through the rotary tumbling drum, so that food products bypass the rotary tumbling drum and the elevator device.

12 Claims, 7 Drawing Sheets

(51) Int. Cl.
*A23B 4/32* (2006.01)
*B05C 3/08* (2006.01)
*B05C 19/04* (2006.01)

(58) Field of Classification Search
USPC .......................................................... 118/19
See application file for complete search history.

(56) References Cited

U.S. PATENT DOCUMENTS 6,058,877 A * 5/2000 Tashiro .................... A21C 9/04
118/19
6,158,332 A 12/2000 Nothum, Sr. et al.
7,231,885 B1 6/2007 Nothum, Jr. et al.

OTHER PUBLICATIONS

International Search Report and Written Opinion from PCT Application No. PCT/NL2018/050861, dated Mar. 13, 2019.

* cited by examiner

COATING OF FOOD PRODUCTS WITH A PARTICULATE COATING MATERIAL

BACKGROUND

The invention relates to a food products coating machine and method for coating food products with a particulate coating material, for example in an in-line arrangement with other food processing equipment, e.g. allowing for large scale food products preparation wherein large volumes of food pieces are coated, e.g. allowing subsequent cooking, e.g. by frying.

In-line food product coating machines for coating with a particulate coating material are well-known from the prior art and widely available in the field. The particulate coating material might range in composition from a flour mixture to a coarse bread-crumb mixture, e.g. comprising crumbs, e.g. a mixture of coarse and fine particles. The coating material may be composed of a mixture of very different particulate materials, not only with respect to particle size, but also, or alternatively, with respect to their structure, basis, etc. The various kinds of coating material allow inclusion of spices or flavourings within the mixture, e.g. adding flavour and/or texture to the product.

It is desired to obtain adequately coated food products. In particular combinations of food products, e.g. chicken, and coating material, such as crumbs, it is common to apply a rotary tumbling drum for tumbling food products and particulate coating material together, such that a fraction of the particulate coating material adheres to the food product.

From U.S. Pat. No. 5,937,744 in the name of Nothum a coating machine is known wherein the food product can be routed at the option of the operator(s) of the coating apparatus to bypass the rotary tumbling drum. Bypassing the rotary tumbling drum is desirable when processing so-called "formed" food products, such as beef patties or fish cakes and the like, which are fragile and would disintegrate in the rotary tumbling drum.

SUMMARY

The aim of the present invention is to provide an alternative and more versatile coating machine and method, allowing both a drum-mode wherein the food products and particulate coating material are tumbled together, and a conveyor-mode wherein the food products are conveyed on a conveyor and the rotary tumbling drum is bypassed.

A method wherein in a conveyor-mode of the coating machine the position of the release end of the infeed conveyor assembly and the receiving part of the discharge conveyor assembly, possibly with a temporary bridging conveyor, are arranged to adjoin each other whilst extending through the rotary tumbling drum, so that food products bypass the rotary tumbling drum and the elevator device. The conveyor-mode allows for example the handling of relatively delicate or fragile food products, e.g. formed products such as patties, to bypass the rotary tumbling drum and the elevator device, e.g. in order to avoid disintegration of the delicate food products when they would be subjected to the action of the tumbling drum.

In embodiments, the release end of the infeed conveyor assembly is configured to extend via the intake opening into the rotary tumbling drum, wherein the infeed conveyor assembly is provided with a release end adjusting mechanism for adjusting the longitudinal position of the release end of the infeed conveyor assembly relative to the rotary tumbling drum.

It is conceivable that in a 'retracted' position of the release end the coating machine is in the drum-mode, allowing the dropping of the products to be coated onto the drum wall of the rotary tumbling drum. Possibly, the release end is at the intake opening of the drum wall. It is also possible that the release end of the infeed conveyor assembly is at a distance from the intake opening of the rotary tumbling drum, while still allowing products to be dropped onto the drum wall, e.g. via a chute. Such a fully retracted position beyond the intake opening of the drum wall can also be beneficial for other purposes, such as for cleaning or exchange of the rotary tumbling drum.

In embodiments, the release end in a fully 'extended' position adjoins the discharge conveyor assembly, i.e. the conveyor-mode. Alternatively, one or more temporary bridging conveyors are provided between the release end and the discharge conveyor assembly to arrive at the conveyor-mode of the coating machine.

In embodiments, distinct modes of the coating machine are also conceivable by distinct positions of the release end, along a length of the drum wall. These modes differ in that products are allowed to tumble less with the release end extending more into the rotary tumbling drum, and tumble more with the release end closer to the intake of the rotary tumbling drum. Hence, the amount of tumbling can be set, adding versatility to the coating machine.

In alternative embodiments, the receiving part of the discharge conveyor assembly is allowed to extend via the discharge opening into the rotary tumbling drum, and wherein the discharge conveyor assembly is provided with a receiving part adjusting mechanism for adjusting the longitudinal position of the receiving part of the discharge conveyor assembly relative to the rotary tumbling drum. In a possible conveyor-mode of the coating machine the position of the receiving part is extended to adjoin the release end of the infeed conveyor assembly. In an optional cleaning mode the receiving part is allowed to a position beyond the outflow opening of the elevator device, allowing the cleaning or possible removal of the elevator device.

The coating machine of the invention comprises preferably in-line with each other and in succession: an infeed conveyor assembly, a rotary tumbling drum with a longitudinal axis, an elevator device with a longitudinal axis and a longitudinal discharge conveyor assembly. With "in-line with each other" is meant that the food products are able to successively pass the infeed conveyor assembly, rotary tumbling drum, elevator device, and discharge conveyor assembly. In possible embodiments, but not necessarily, the longitudinal axes of both conveyors, rotary tumbling drum and elevator device coincide. It is also conceivable that these longitudinal axes include an angle with each other, in the horizontal and/or in the vertical plane. It is also possible that the longitudinal axis of the rotary tumbling drum is below or above the longitudinal axis of the infeed conveyor assembly, as long as the dropping to the products to be coated onto the drum wall of the rotary tumbling drum is possible.

In embodiments, the rotary tumbling drum and the elevator device are commonly driven. Possibly, the rotary tumbling drum and the elevator device are coupled to each other. It is also conceivable that the rotary tumbling drum and the elevator device are integrally formed.

It is highly preferred that the infeed conveyor assembly and discharge conveyor assembly extend horizontally, at least the runs thereof supporting the food products as they pass through the machine. In particular round products such as meat balls are difficult to be transported on an angled conveyor, as gravity will also attribute to movement of the food products. With horizontally extending conveyors, and in the conveyor-mode possibly adjoining one-another, these conveyors preferably extend at a same first horizontal level.

In the drum-mode of the coating machine, at the release end of the infeed conveyor assembly, the food products drop into the drum of which the drum wall is at a second, lower horizontal level. The coated food products and excess coating material arrive at the outflow opening of the rotary tumbling drum fall. The bottom part or lowest point at the outflow opening is either at the same, second horizontal level, or even at a lower, third horizontal level in case the rotary tumbling drum is positioned at an angle to provide a structure for advancing the mixture of coating material and food products in the direction of the discharge opening.

In advantageous embodiments with the discharge conveyor assembly provided in line with the infeed conveyor assembly at the first horizontal level, the products at the outflow opening of the rotary tumbling drum have to be lifted to this first horizontal level.

An elevator device is provided, adapted for lifting the coated food products at least to the first horizontal level. The elevator device is provided at the discharge opening of the rotary tumbling drum. In the drum-mode the elevator device receives the coated food products and possibly excess coating material at the lower bottom portion of the rotary tumbling drum.

In embodiments, the intake end of the elevator device is provided adjacent the discharge opening of the rotary tumbling drum. Alternatively, it is conceivable that a transfer unit is provided between the rotary tumbling drum and the elevator device, collecting the food products and particulate coating material from the rotary tumbling drum and transferring them to the elevator device. Such a transfer unit is preferably embodied as a chute.

The rotary tumbling drum of the invention is adapted for tumbling food products and particulate coating material together about a longitudinal axis, such that a fraction of the particulate coating material adheres to the food product while the remainder is excess coating material. Tumbling will attribute to the adherence of the coating material to the food product. The rotary tumbling drum is driven by a rotary tumbling drum drive motor to rotate the rotary tumbling drum about its longitudinal axis, at a rotary tumbling drum rotation speed. This rotary tumbling drum rotation speed is preferably variable, in particular for different types of food products and/or different types of coating material to provide an optimum adherence of the coating material to the food product. Such a variable rotary tumbling drum rotation speed may thus add versatility to the coating machine.

In a drum-mode of the coating machine it is conceivable that the particulate coating material is supplied directly to the rotary tumbling drum, and that uncoated food products are supplied to the rotary tumbling drum. In another embodiment a mixture of food products and coating material is dropped from the release end, e.g. as the food products have already passed a top coating unit and/or a bottom coating unit of the machine.

In the conveyor-mode, and also optionally in the drum-mode, it is conceivable that the infeed conveyor assembly conveys both the food products and the coating material and drops both onto the drum wall of the rotary tumbling drum.

In embodiments, the coating machine further comprising a coating unit, positioned above the infeed conveyor assembly upstream of the rotary tumbling drum, allowing the discharge of particulate coating material onto the food products. A portion of the particulate coating material will adhere to the food product while the remainder is excess coating material which may be conveyed with the infeed conveyor assembly into the rotary tumbling drum.

The coating unit e.g. comprises a storage hopper with a sloping bottom wall, allowing the dropping of coating material under the influence of gravity. Alternative mechanisms of discharging coating material are also conceivable.

Preferably, the coating unit comprises an introduction opening at a top end thereof for receiving the excess coating material that is recovered for re-use.

The rotary tumbling drum of the invention comprises a drum wall between an intake opening and a discharge opening. Preferably the drum wall is closed to prohibit particulate coating material to fall out.

In embodiments, the rotary tumbling drum comprises a structure for advancing the mixture of coating material and food products in the direction of the discharge opening. In embodiments, the rotary tumbling drum is positioned at an angle, as a result of which the mixture will advance. It is also possible to provide an auger at the inside of the rotary tumbling drum, e.g. at the inside of the drum wall, for advancing the mixture of coating material and food products in the direction of the discharge opening.

It is also conceivable that the rotary tumbling drum comprises internal agitator members provided at the inside of the drum wall, to successively lift and drop the mixture of food products and particulate coating material, thereby tumbling and mixing the food products and particulate coating material.

Such internal agitator members are commonly known and possibly comprise a plurality of porous baffles, nubs, dimples and/or ridges. In embodiments, they extend in the longitudinal direction of the rotary tumbling drum. Possibly, the internal agitator members are mechanically formed integral with a circumferential inside structure of the drum wall. In embodiments, it is conceivable that the internal agitator members are active, operable members. The ability to operate such active internal agitator members further attribute to the versatility to the coating machine.

In possible embodiments, the internal agitator members are configured to form a structure for advancing the mixture of coating material and food products in the direction of the discharge opening. Possibly, the internal agitator members form an internal auger to achieve this effect.

In embodiments, the rotary tumbling drum is removable, e.g. for cleaning purposes.

It is conceivable that a particular combination of internal agitator members and/or structure for advancing the mixture of coating material provides an optimum adherence of a particular coating material to a particular food product, while another combination provides an optimum adherence of another coating material and/or another food product. Hence, a coating system is conceivable wherein multiple rotary tumbling drums having distinct configurations are available, e.g. having distinct internal augers or distinct internal agitators. Providing such an exchangeable rotary tumbling drum may thus further add versatility to the coating machine.

In embodiments the infeed conveyor assembly and/or the discharge conveyor assembly comprises:
  an excess coating material bed support adapted to receive thereon excess coating material and forming an excess coating material bed of said separated excess coating material on said excess coating material bed support,
  a conveyor run above said excess coating material bed support and movable relative to said bed support and configured to convey said food product over said excess coating material bed support.

Advantageously, the conveyor run is adjustable in the conveyor-mode of the coating machine, e.g. the conveyor run of the infeed conveyor assembly to adjust the position of the release end, and/or the conveyor run of the discharge conveyor assembly to adjust the position of the receiving part. Possibly, also the excess coating material bed supports are adjustable, or a support insert is provided, to be positioned below the adjusted part of the conveyor run.

The longitudinal discharge conveyor assembly comprises a receiving part for receiving the coated food products, and possibly excess coating material. In the conveyor-mode, the receiving part adjoins the infeed conveyor assembly or a bridging conveyor, receiving the coated food products from the release end of the infeed conveyor assembly, or from a temporary bridging conveyor.

In the drum-mode, the receiving part is receives the coated food products from the elevator device. In embodiments, the receiving part extends into the central opening of the elevator device, to receive the coated food products which drop down out of the pockets at the upper part of the elevator device. Alternatively, a chute is provided between the elevator device and the discharge conveyor assembly to transfer the coated food products from the elevator device onto the discharge conveyor assembly.

In embodiments, the elevator device comprises a mobile array of pockets adapted to receive therein the coated food products, said elevator device being adapted to move said mobile array of pockets along an endless path that passes said discharge opening of the rotary tumbling drum in order to fill coated food products and possibly also excess coating material from the rotary tumbling drum into said pockets and that passes the receiving part of the discharge conveyor assembly in order to discharge said coated food products from said pockets and supply said discharged coated food products onto said discharge conveyor assembly.

Possibly, the elevator device comprises a food product elevator wheel, comprising:
- an annular wheel body adapted to revolve about an axis of rotation by an elevator wheel drive, having a central opening;
- a circumferential array of pockets in said annular wheel body, the pockets being open towards the central opening of the elevator wheel;
- wherein preferably the elevator wheel drive is independent from the rotary tumbling drum drive, allowing distinct drive speeds.

The elevator device is preferably embodied similar to the one described in NL1020511. It comprises an annular body with a horizontal rotation axis, a peripheral wall and a central opening. The annular body comprising inwardly extending lifting paddles and radially inwardly extending annular flanges, each along an edge of the peripheral wall. A circumferential array of pockets is defined by the lifting paddles, the annular flanges and a bottom, preferably formed by the peripheral wall. The pockets are open towards the central opening of the elevator wheel. These pockets are adapted to receive the excess coating material from the filling assembly. The lifting paddles are able to lift this the excess coating material as the elevator wheel revolves, and the excess coating material is allowed to drop down by gravity out of the pockets into the top coating unit. An elevator drive, e.g. including an electric motor, is provided for revolving the elevator device.

The coated food products are gravity fed from a pocket onto a receiving part of the discharge conveyor assembly. In embodiments, the structure of the pockets also distributes the coated food products over the discharge conveyor assembly. In embodiments, the structure of the pockets is such that one or more walls of the pocket extend at an angle with respect to a longitudinal axis.

In embodiments, the elevator drive is independent from the rotary tumbling drum drive, allowing distinct drive speeds. Hence, the speed of lifting the coated products can be set independently of the rotary tumbling drum rotation speed, which is preferably variable, in particular for different types of food products and/or different types of coating material to provide an optimum adherence of the coating material to the food product. Distinct drive speeds add versatility to the coating machine.

The in-line multi-mode coating machine of the invention is possibly preceded by a pre-dusting device, and/or a battering device for applying batter. The machine can, in a suitable embodiment and/or supplied with suitable coating material, also be used as a pre-dusting device, e.g. with a battering device downstream of the inventive machine, Downstream of the machine a heating device may be arranged, such as a cooking or frying device, e.g. an oven, or chilling means such as a freezer.

Food products that can be coated with a coating machine according to the invention include food products such as vegetables and meat, e.g. cut meat or formed meat such as burgers, in particular sea-food, poultry, red meat, fish, sea-food, pork, beef and so on.

The present invention also relates to a method for in-line coating of food products, wherein use is made of an in-line coating machine as discussed herein.

The present invention also relates to a method for in-line coating of food products, wherein use is made of an in-line coating machine according to the invention, and wherein in a drum-mode:
- the infeed conveyor assembly is operated to convey products to be coated and to drop the products to be coated onto the drum wall of the rotary tumbling drum,
- the rotary tumbling drum is operated to tumble and mix the food products and particulate coating material together and to advance the mixture of coating material and food products in the direction of the discharge opening;
- the elevator device is operated to lift the coated food products and drop the coated food products down by gravity, to be received by the longitudinal discharge conveyor assembly which is operated to convey the coated products, and wherein in a conveyor-mode
- the infeed conveyor assembly and the discharge conveyor assembly and possibly a temporary bridging conveyor are operated to convey food products to be coated and coated food products whilst extending through the rotary tumbling drum, so that food products bypass the rotary tumbling drum and the elevator device.

BRIEF DESCRIPTION OF THE DRAWINGS

The invention will now be explained with reference to the drawings. In the drawings:

FIG. 2b shows a perspective view in a direction opposite the direction of conveyance of the multi-mode coating machine of FIG. 2a;

FIG. 2c shows a perspective view from above of the multi-mode coating machine of FIG. 2a;

FIG. 5b shows a perspective side view of the multi-mode coating machine of the invention in the conveyor-mode of FIG. 5a.

DETAILED DESCRIPTION OF VARIOUS EMBODIMENTS

With reference to the figures an exemplary embodiment of an in-line multi-rotary tumbling drum coating machine 1 according to the invention will be discussed. The machine 1 is adapted to coat food products 2a, 2b with a particulate coating material, such as breading crumb material.

The in-line multi-mode coating machine 1 comprises in-line with each other and in succession, seen in a direction of conveyance C: an infeed conveyor assembly 10, a rotary tumbling drum 20, an elevator device 30 and an discharge conveyor assembly 40.

In practical embodiments the width of the conveyor assemblies of the coating machine may be between 40 and 100 centimetres.

The diameter of the rotary tumbling drum and the elevator device is greater than said width, e.g. in the range between 60 and 120 centimetres. For example the diameter of the drum and elevator device is at least 20 centimetres greater than the width of the section of the conveyor assembly extending through the drum in the conveyor mode. Preferably the width of the conveyor assemblies of the machine is the same, e.g. when formed by one and the same conveyor belt, e.g. wire mesh belt. e.g. exceeds 60 cm, preferably 90 cm, allowing the passage of a conveyor having a conveyor width of 50-80 cm in the conveyor-mode.

The rotary tumbling drum 20 is adapted to be supplied with particulate coating material and to tumble, driven by drive 29, the food products and particulate coating material together about a longitudinal axis 21, here a horizontal longitudinal axis, to subject the food products to a coating treatment wherein some of the particulate coating material adheres to the food products while the remainder is excess coating material. The rotary tumbling drum comprises a drum wall 22 between an intake opening 25 and a discharge opening 26.

Figure 1:
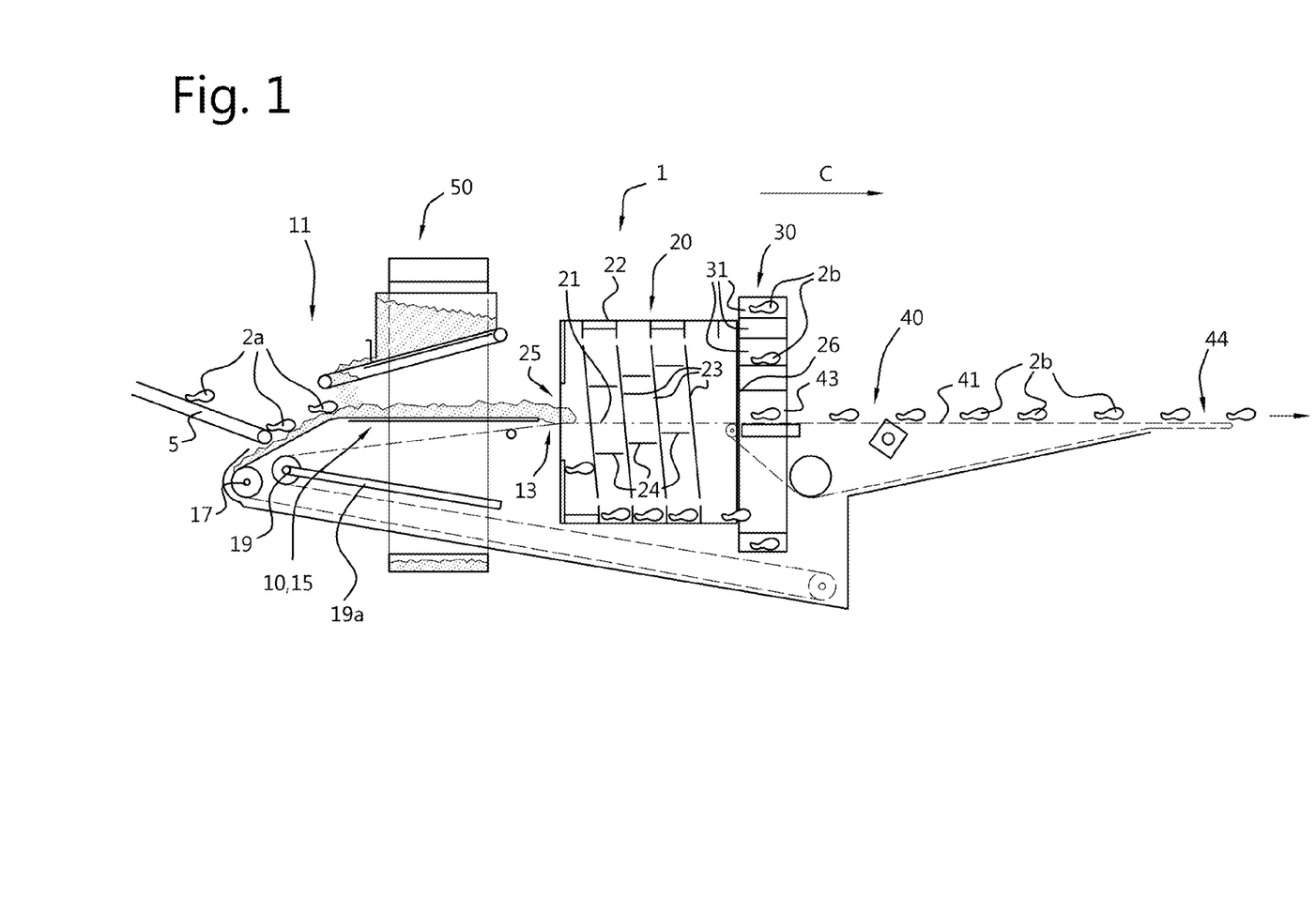
FIG. 1 shows a schematic cross-section of an embodiment of a multi-mode coating machine of the invention in the drum-mode.

In the embodiment of FIG. 1, the drum wall 22 is provided on the inside thereof with a helical structure 23 configured to advance or assist in advancing the mixture of coating material and coated food products in the direction towards the discharge opening 26. Alternative structures for achieving this advancing effect are also conceivable.

It is also conceivable, as in the embodiment of FIGS. 2a-2c and 3a-3c, that the mixture and products are advanced without the presence of such a structure.

As can be seen the drum 20 has an intake opening 25 delimited by an inward annular flange 20a of the drum. In some figures this flange is transparent.

Figure 2A:
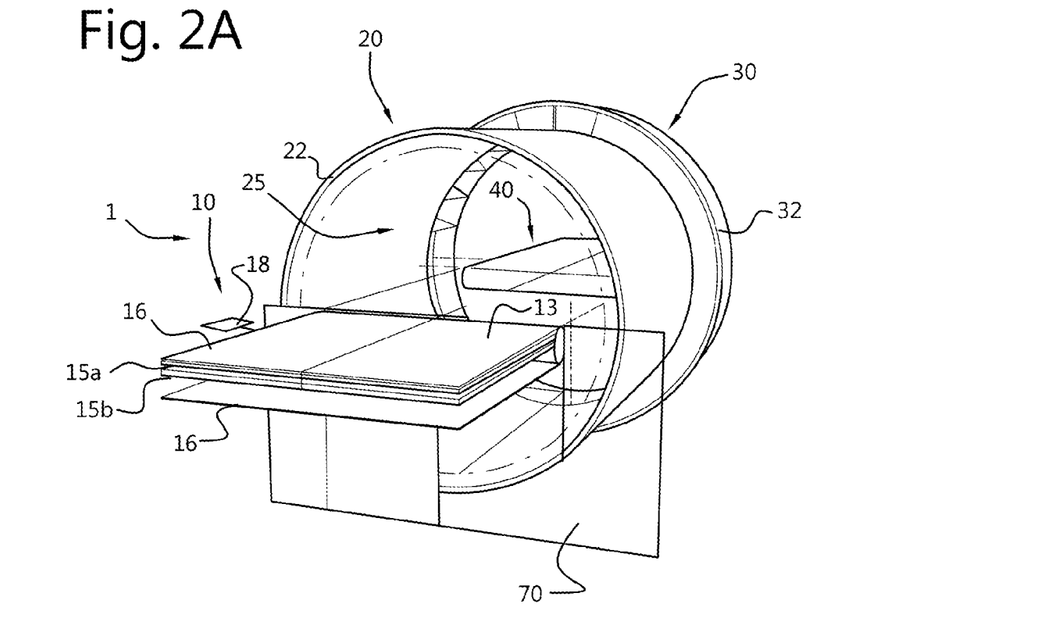
FIG. 2a shows a perspective view in a direction of conveyance into a multi-mode coating machine of the invention in the drum-mode.
Figure 2B:
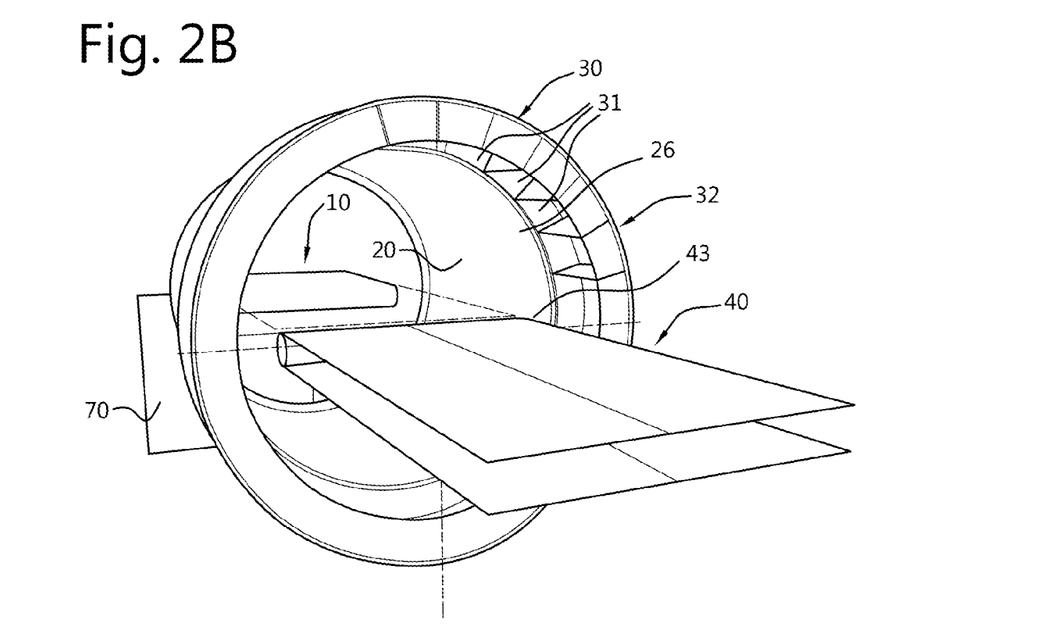
Figure 2C:
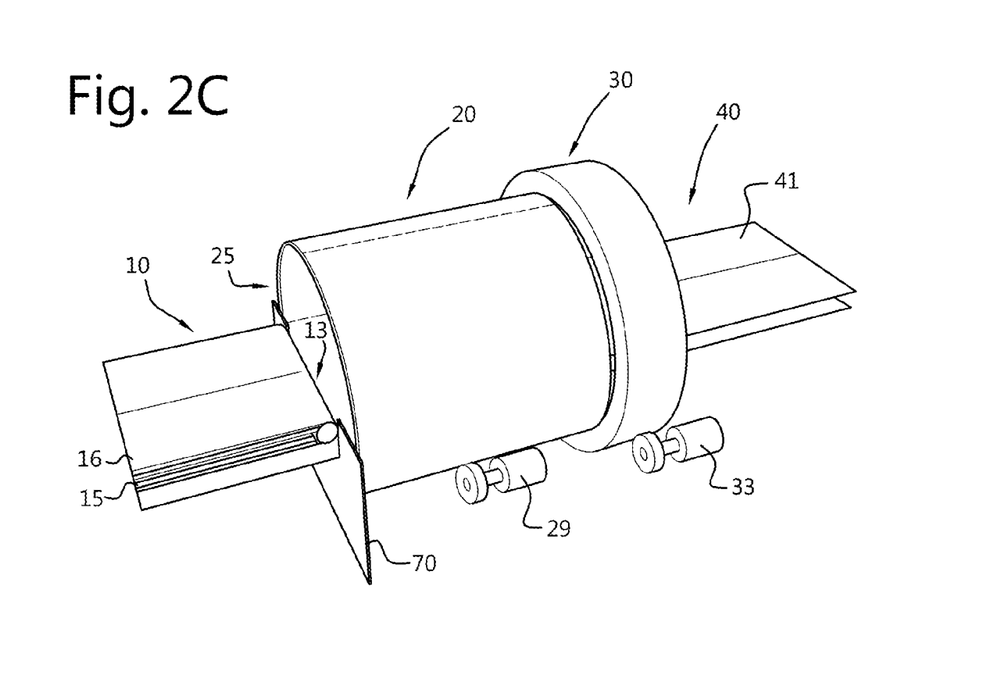

In embodiments it is envisaged that a substantial amount of coating material is deposited in the drum via the release end 13 of the conveyor 10, which piles up in the drum 20. In order to avoid an overflow out of the drum via the lower portion of the intake opening 25 the machine 1 has a shield panel 70 that covers the lower portion of the intake opening, possibly up to the height of the release roller 13. Here the panel 70 is stationary mounted close to the head end of the tumbling drum 20. In FIG. 2a part of the panel 70 is shown transparent.

Figure 3A:
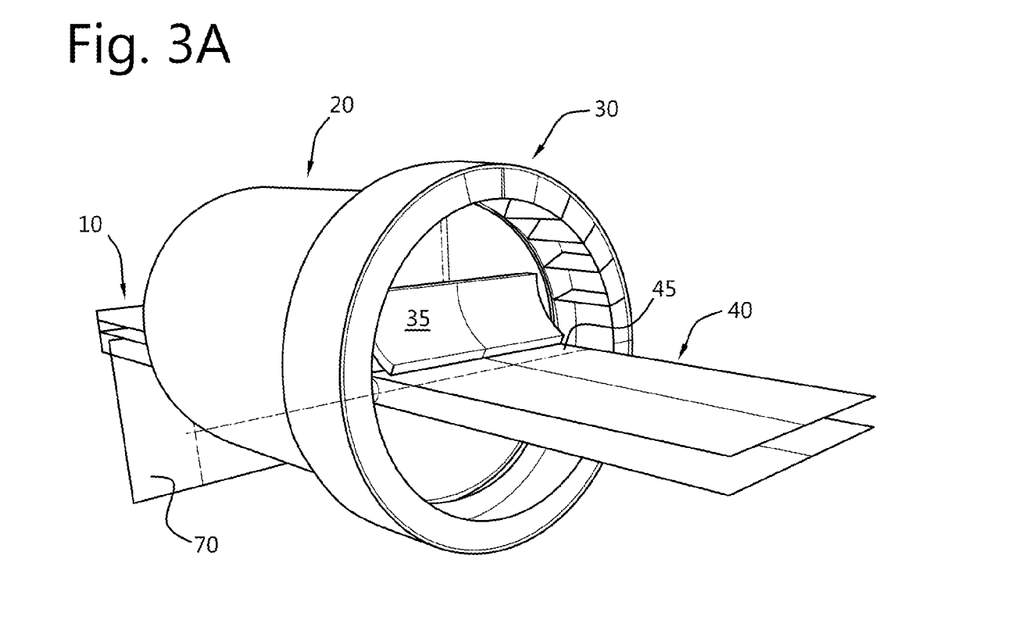
FIG. 3a shows a perspective view of the multi-mode coating machine similar to FIG. 2b, further including a chute between the elevator device and the discharge conveyor assembly.
Figure 3B:
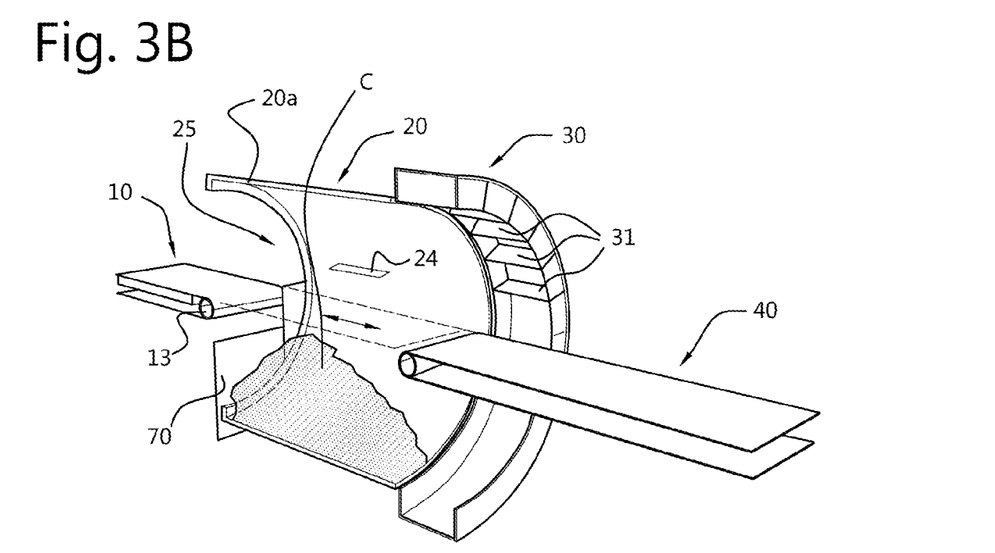
FIG. 3b shows a detail of the perspective view of FIG. 2b.
Figure 3C:
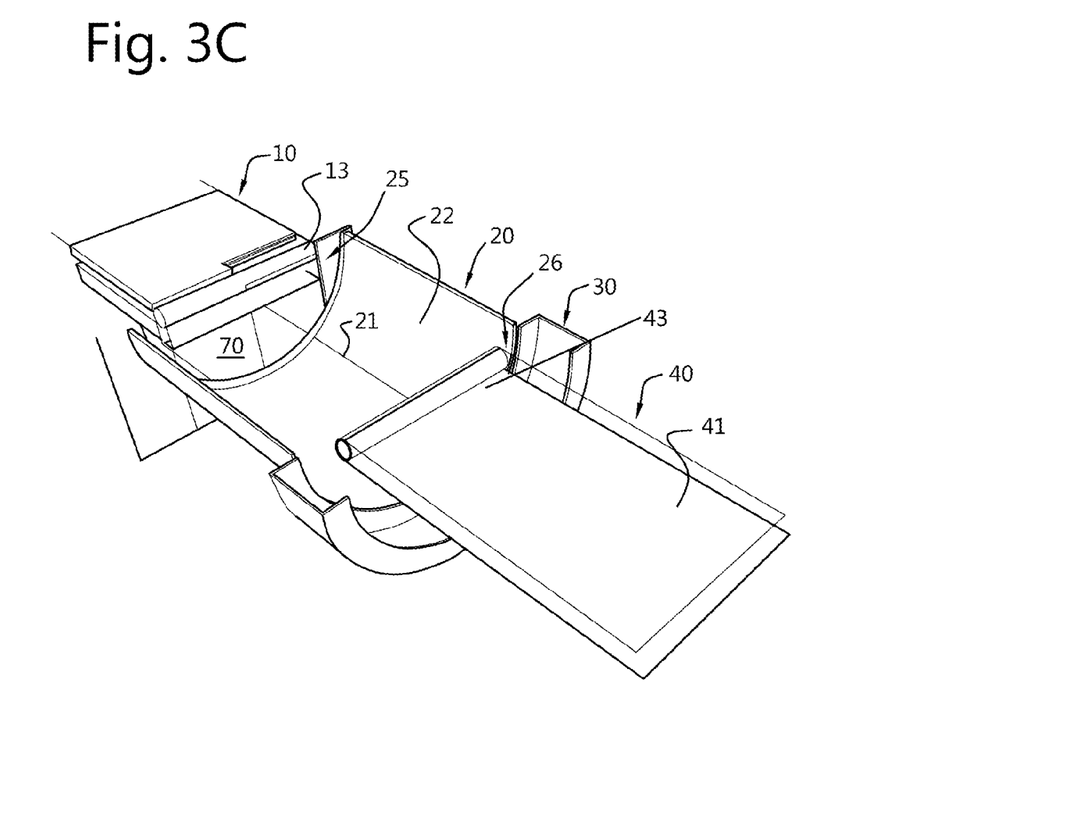
FIG. 3c shows a detail of the perspective view of FIG. 2c.

FIG. 3b schematically depicts that coating material and food products pile up in the rotating drum, with—in operation—some of this mass being entrained by agitator members 24.

In the embodiment of FIG. 1, further internal agitator members 24 are provided at the inside of the drum wall 22 to repeatedly lift and drop the mixture of food products and particulate coating material, thereby tumbling and mixing the food products and particulate coating material. It is conceivable that the configuration of the internal agitator members 24 at the same time form a structure for advancing the mixture of coating material and food products in the direction of the discharge opening.

Alternative, not shown agitator members for achieving this effect are also conceivable. For example, at shown from FIGS. 1 and 3B, the internal agitator members may comprise plates or baffles on the drum wall 22 of the drum 20 to effect agitation of the contents of the drum 20. It is also conceivable, as in the embodiment of FIGS. 2a-2c and 3a-3c, that the mixture and products are lifted and dropped without the presence of such internal agitator members.

The coating machine 1 generally has an infeed conveyor assembly 10 that is adapted to receive the food products to be coated 2a at an inlet 11 of the machine. For example the food products have already passed a batter machine and/or a pre-dusting machine. Here the products 2a are fed to the inlet 11 by a conveyor 5, e.g. of such other machine.

The infeed conveyor assembly 10 is adapted for conveying the products to be coated to a release end 13 of the conveyor assembly and allowing in a drum-mode of the coating machine the dropping of the products to be coated onto the drum wall 22 of the rotary tumbling drum 20.

In the embodiment of FIG. 1 the release end 13 seems to extend a little into the rotary tumbling drum 20. In the embodiments shown in the detailed views of FIGS. 2c and 3c the release end 13 is positioned adjacent, but not into the intake opening 25 of the rotary tumbling drum 20.

In the embodiment of FIG. 1 furthermore a top coating unit 50 is shown, positioned above the infeed conveyor assembly 10, upstream of the rotary tumbling drum 20, allowing the discharge of particulate coating material onto the food products. The shown coating unit resembles the commercially available RotoCrumb. A skilled person is familiar with multiple alternative coating units, which are all suitable to be combined with the in-line multi-mode coating machine of the invention.

In the embodiment of FIGS. 2a-2c and 3a-3c, it is visible that the infeed conveyor assembly 10 comprises an excess coating material bed support 15, adapted to receive thereon excess coating material and forming an excess coating material bed of said separated excess coating material on said excess coating material bed support. There is a conveyor run 16 above said excess coating material bed support, which is movable relative to said bed support and configured to convey said food product over said excess coating material bed support 15.

In the depicted embodiment the coating machine comprises an endless belt 16, preferably with a mesh belt, e.g. a (stainless steel) wire mesh belt as is rather common in the art. A motor drive, e.g. of variable speed, is provided to move the belt 16. For example, the motor drive drives shaft 17 over which the conveyor run 16 is guided.

An upper run of the belt 16 here forms part of the infeed conveyor assembly of the machine 1. In operation of the machine the bottom coating material bed support 15 supports thereon a bottom coating material bed.

The advancing conveyor run 16 conveys this bottom coating material bed over the bottom coating material bed support 15. As shown here, the bottom coating material bed receives food products to be coated in proximity of the inlet 11 of the machine 1.

The top coating device 50 that is supplied with particulate coating material discharges particulate coating material from above onto the food products 2a received by the bottom coating material bed and conveyed by the bottom coating material bed advancing conveyor run 16.

The infeed conveyor assembly 10 and rotary tumbling drum 20 are positioned in-line with each other and in succession. The in-line multi-mode coating machine 1 further comprises, also in-line and in succession, an elevator device 30 and a discharge conveyor assembly 40.

In the embodiment of FIGS. 2a-2c and 3a-3c, it is visible that the coating machine further comprises an endless belt 41, preferably with a mesh belt, e.g. a (stainless steel) wire mesh belt as is rather common in the art. A motor drive, e.g. of variable speed, is provided to move the belt 41. An upper conveyor run of said belt 41 is movable and configured to convey the coated food products in a direction of conveyance.

The upper run of the belt 41 here forms part of the discharge conveyor assembly 40 of the machine 1. The advancing upper run 41 is adapted to receive the coated food products 2b which are gravity fed from the elevator device 30 onto a receiving part 43 of the discharge conveyor assembly, and to convey the coated food products to an outlet 44 of the machine 1.

In the shown configuration, the advancing conveyor run 16 and the advancing upper run 41 of extend horizontally and at generally the same first horizontal level.

The in-line multi-mode coating machine 1 further comprises an elevator device 30, which is adapted to receive the mixture of a portion of said excess coating material and coated food products from the discharge opening 26 of the rotary tumbling drum and to supply said coated food products to the discharge conveyor assembly 40. The elevator device 30 is positioned adjacent and downstream in the direction of conveyance of the rotary tumbling drum 20.

In the shown embodiments, the elevator device 30 comprises a mobile array of pockets 31, adapted to receive therein the coated food products, said elevator device being adapted to move said mobile array of pockets along an endless path that passes said discharge opening 26 of the rotary tumbling drum 20 in order to fill coated food products and possibly also excess coating material from the rotary tumbling drum into said pockets and that passes the receiving part 43 of the discharge conveyor assembly 40 in order to discharge said coated food products from said pockets and supply said discharged coated food products onto said discharge conveyor assembly. In the drum-mode, the discharge conveyor assembly 40 is positioned downstream of the elevator device 30, and may be positioned adjacent the elevator device 30 or extend party into the elevator device. It is conceivable that in the conveyor-mode, the discharge conveyor assembly 40 extends through the elevator device 30, and possibly even (partly) through the rotary tumbling drum 20.

The elevator device 30 here comprises a food product elevator wheel with an annular wheel body 32 adapted to revolve about an axis of rotation 21, here coinciding with the longitudinal axis of the rotary tumbling drum 20, by an elevator wheel drive 33. The elevator wheel 30 is for example rotatably supported in a frame of the machine 1, e.g. on rollers, to revolve about a substantially horizontal axis of revolution. A motor drive, e.g. of variable speed, is provided to drive the wheel 30, e.g. a wheel having a circular toothed rack and the drive having a mating pinion.

The elevator wheel 30 has a circumferential array of pockets 31 in said annular wheel body 32, the pockets being open towards a central opening of the elevator wheel. In preferred embodiments, the elevator wheel drive is independent from the rotary tumbling drum drive, allowing distinct drive speeds.

In FIG. 3a a chute 35 is visible, provided in the central opening of the elevator wheel, for guiding products dropping out of the pockets of the elevator device onto the receiving part 43 of the discharge conveyor assembly 40. Such a chute 35 allows a configuration wherein the discharge conveyor assembly 40 is positioned at a (small) distance from the elevator device 30. The chute advantageously attributes to remaining the integrity of delicate products.

The provision of a chute could also attribute to a distribution of products onto the receiving part of the discharge conveyor assembly. For example, a chute could align products in the direction of conveyance. In addition or alternatively, products could be distributed over the width of the receiving part of the discharge conveyor assembly. In embodiments, the chute is provided with alignment means such as grooves.

It is also conceivable that the chute is provided with openings acting as sieve for excess coating material. Optionally, the chute is provided with a vibration motor, assisting in the sieving of excess coating material.

Figure 4:
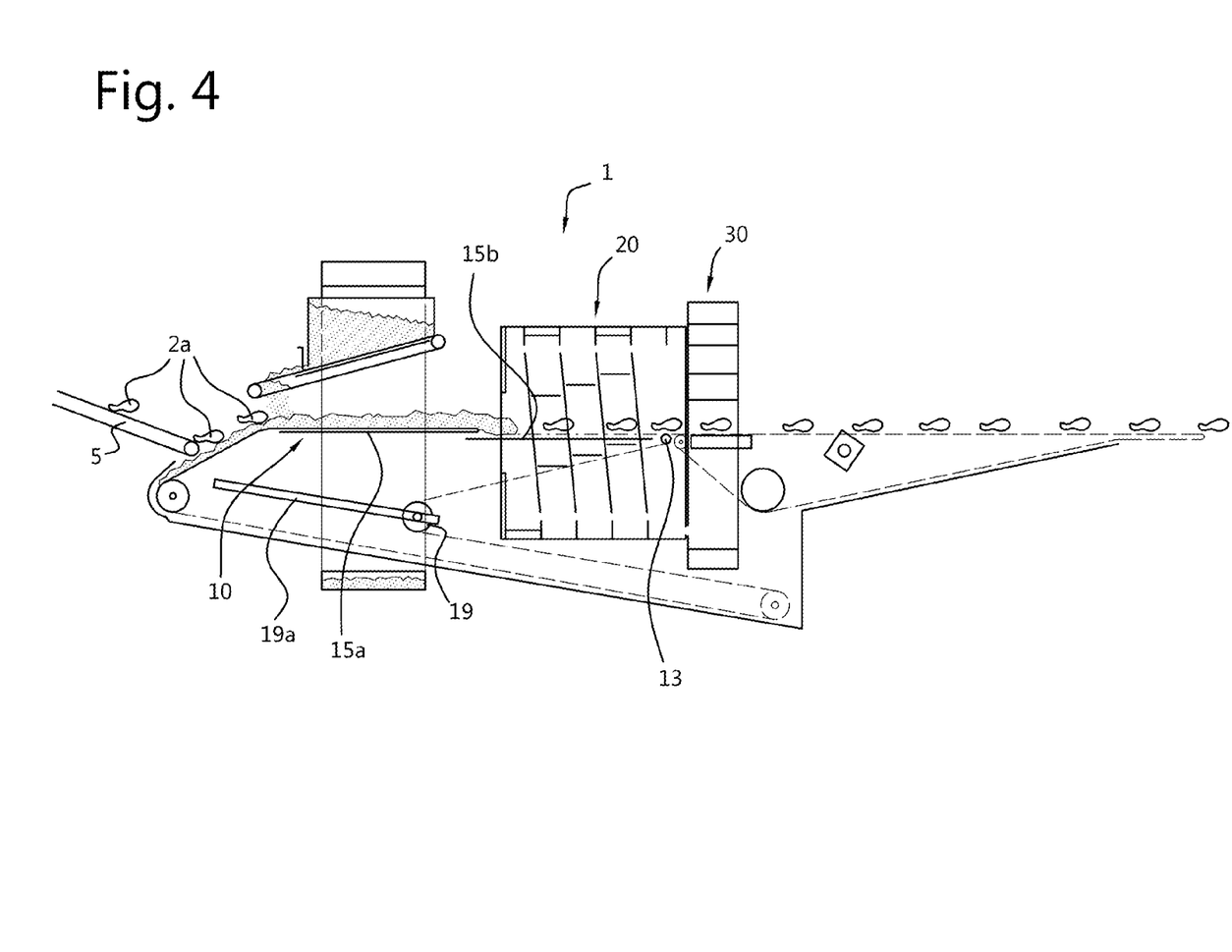
FIG. 4 shows a schematic cross-section of an embodiment of a multi-mode coating machine of the invention, similar to FIG. 1, in the conveyor-mode.

In FIG. 4 the in-line multi-mode coating machine is shown in the conveyor-mode, wherein the position of the release end 13 of the infeed conveyor assembly 10 and the receiving part 43 of the discharge conveyor assembly 40 are arranged to adjoin each other whilst extending through the rotary tumbling drum, so that food products bypass the rotary tumbling drum and the rotary elevator wheel.

Figure 5A:
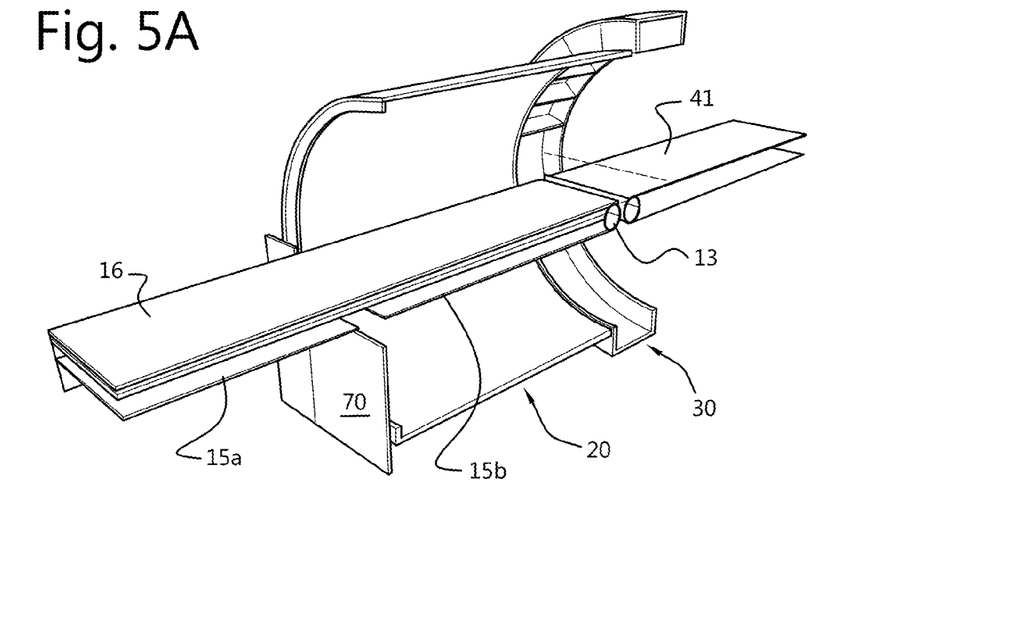
FIG. 5a shows a perspective view in a direction of conveyance into a detail of a multi-mode coating machine of the invention in the conveyor-mode.
Figure 5B:
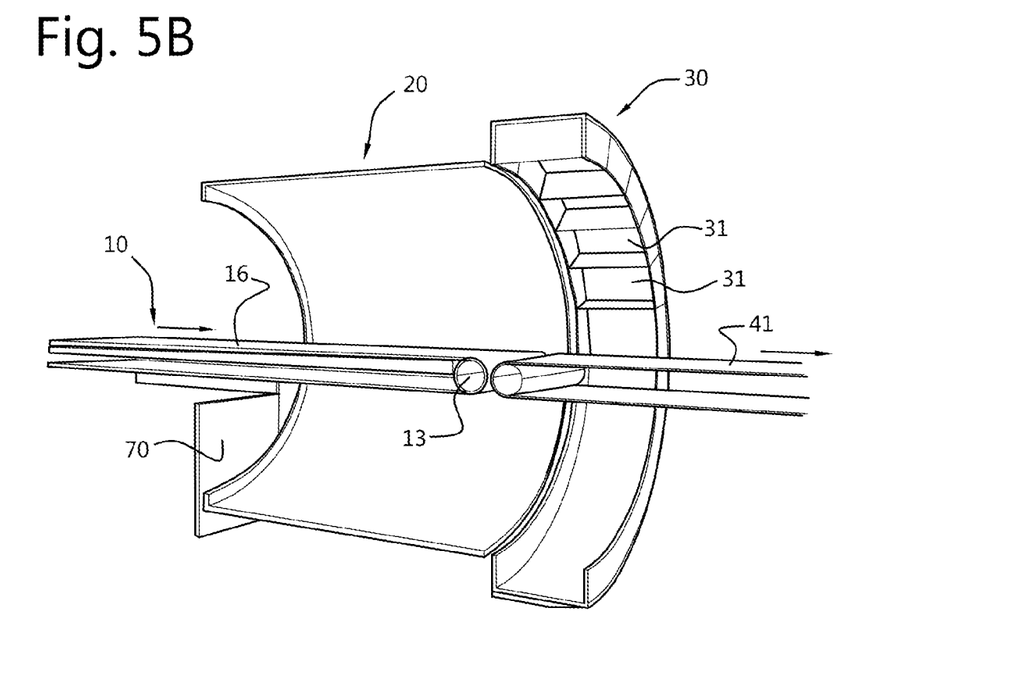

In the shown embodiments of FIG. 4 and FIGS. 5a and 5b, the release end 13 of the infeed conveyor assembly 10 is allowed to extend via the intake opening 25 into the rotary tumbling drum 20.

Here, the infeed conveyor assembly 10 is provided with a release end adjusting mechanism 18 for adjusting the longitudinal position of the release end 13 of the infeed conveyor assembly relative to the rotary tumbling drum 20. This mechanism 18 for example comprises a telescopic support for the release end roller of the assembly 10 at said release end. Here, as preferred, the support bed 15 also is telescopic with bed plates 15a, 15b, wherein bed plate 15b slides relative to stationary bed plate 15a when the mechanism 18 is operated.

For example the mechanism 18 comprises a spindle drive, e.g. manually operable, to adjust the position of the release end 13, e.g. to extend and retract a telescopic support for the release end.

As shown, the mechanism 18 is, as preferred, with a conveyor belt length compensation mechanism that is adapted for compensating the length of the conveyor belt 16 of the infeed conveyor upon adjusting the position of the release end 13. Here this compensation mechanism comprises a belt roller 19 that has adjustable positions relative to the frame of the machine, here displaceable over a guide 19a. For example the compensation belt roller 19 is mechanically linked to the release end 13 and/or a telescopic support thereof.

Figure 6:
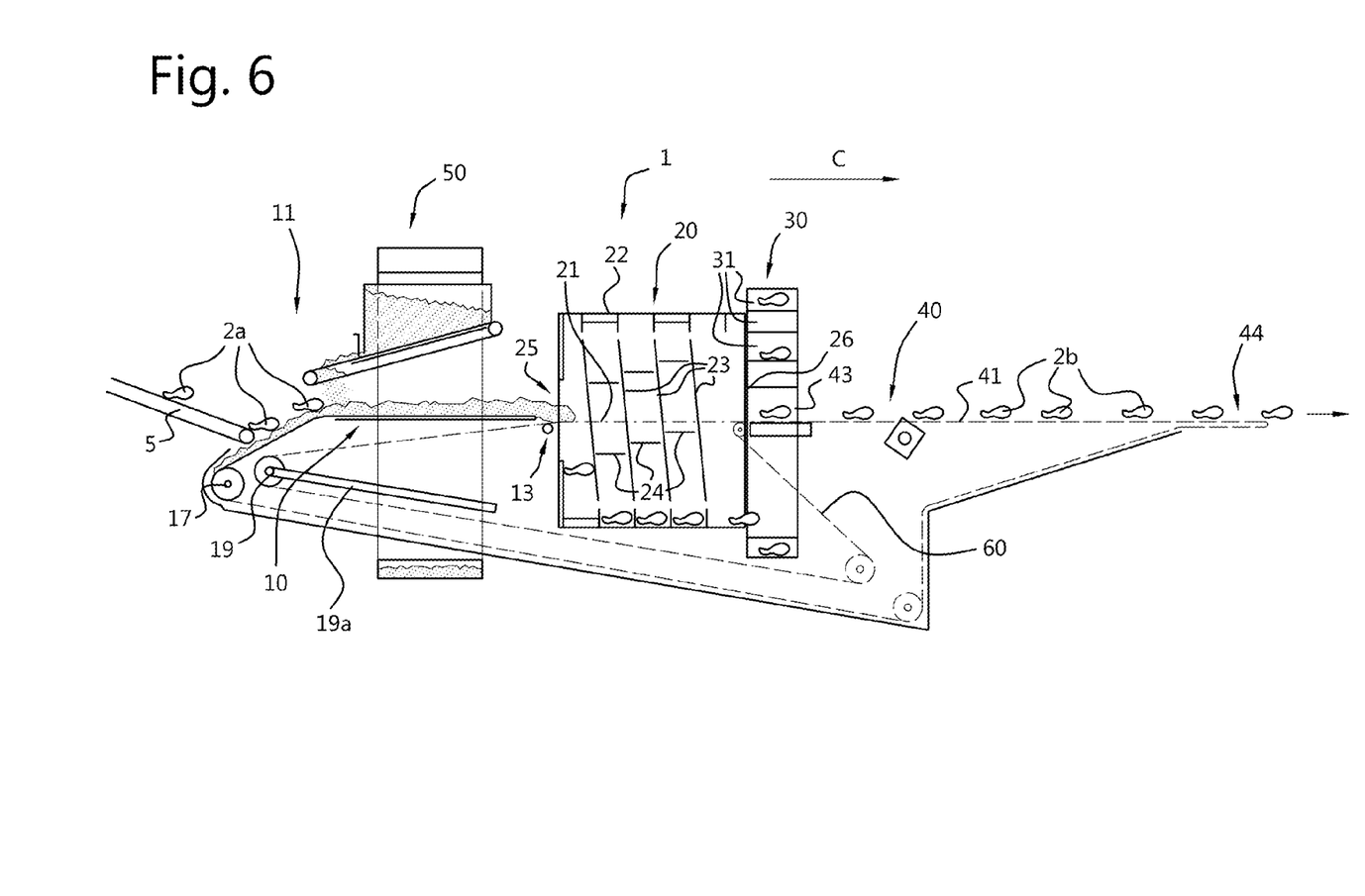
FIG. 6 shows a variant of the machine of FIG. 1.

The FIG. 6 shows a variant of the machine of FIG. 1. Whereas in FIG. 1 two endless belts 16, 41 are depicted, the machine of FIG. 1 has a single endless belt 60 that forms part of both the infeed conveyor assembly 10 and of the discharge conveyor assembly 40.

Here this single endless belt 60 has a front upper run section where the products to be coated are received and a rear upper run section where the coated products are discharged.

As can be seen the single endless belt 60 passes underneath the tumbling drum 20 and the elevator device 30.

The invention claimed is:

1. A coating machine adapted to coat food products with a particulate coating material, the coating machine comprising:
   an infeed conveyor assembly;
   a rotary tumbling drum;
   an elevator device, and
   a discharge conveyor assembly;
   wherein in a drum mode of the coating machine, the rotary tumbling drum is arranged to be supplied with particulate coating material and to tumble the food products and particulate coating material together about a longitudinal axis, to subject the food products to a coating treatment;
   wherein some of the particulate coating material adheres to the food products while a remainder of the particulate coating material is excess coating material;
   wherein the rotary tumbling drum includes a drum wall, an intake opening, and a discharge opening;
   wherein the infeed conveyor assembly is arranged to receive food products to be coated at an inlet of the coating machine and to convey the food products to be coated to a release end of the infeed conveyor assembly, wherein in the drum mode of the coating machine, the coating machine is arranged for dropping of the food products to be coated in the rotary tumbling drum from said release end;
   wherein the elevator device is arranged to receive a mixture of a portion of said excess coating material and coated food products from the discharge opening of the rotary tumbling drum and to supply said coated food products to the discharge conveyor assembly;
   wherein the discharge conveyor assembly is arranged to receive the food products on a receiving part of the discharge conveyor assembly and to convey the coated food products to an outlet of the coating machine, wherein in the drum mode of the coating machine, the food products are gravity fed from the elevator device;
   wherein the coating machine is configured so that in a conveyor mode of the coating machine, a position of the release end of the infeed conveyor assembly and the receiving part of the discharge conveyor assembly is arranged to adjoin each other while extending through the rotary tumbling drum, so that food products bypass the rotary tumbling drum and the elevator device.

2. The coating machine according to claim 1, wherein the release end of the infeed conveyor assembly is extendable through the intake opening and into the rotary tumbling drum; and
   wherein the infeed conveyor assembly is provided with a release end adjusting mechanism adapted to adjust a longitudinal position of the release end of the infeed conveyor assembly relative to the rotary tumbling drum, and provides alternative tumbling action modes of the coating machine, and wherein said release end adjusting mechanism is configured to extend, in the conveyor mode of the coating machine, the release end up to the receiving part of the discharge conveyor assembly so that the food products are transferred from the release end directly onto the receiving part.

3. The coating machine according to claim 1, wherein the infeed conveyor assembly or the discharge conveyor assembly comprises:
   an excess coating material bed support adapted to receive thereon excess coating material and forming an excess coating material bed of said separated excess coating material on said excess coating material bed support;
   a conveyor run above said excess coating material bed support and movable relative to said bed support and configured to convey the food products over said excess coating material bed support.

4. The coating machine according to claim 3, wherein the infeed conveyor assembly and the discharge conveyor assembly extend horizontally and generally at a same first horizontal level.

5. The coating machine according to claim 3, further comprising a top coating unit, positioned above the infeed conveyor assembly and upstream of the rotary tumbling drum, which top coating unit is adapted to deposit particulate coating material onto the food products.

6. The coating machine according to claim 3, wherein the infeed conveyor assembly is combined with a bottom coating device comprising a bottom coating material bed support;
   wherein the bottom coating material bed support is adapted to support thereon a bottom coating material bed of particulate coating material;
   wherein the coating machine is configured so that the food products to be coated are received on said bottom coating material bed; and
   wherein a bottom coating material bed advancing conveyor run of the infeed conveyor passes above said bottom coating material bed support and is configured to convey said bottom coating material bed over said bottom coating material bed support;
   wherein the coating machine is embodied to transfer recovered excess coating material remaining in said excess coating material bed downstream of said elevator device to the bottom coating material bed advancing conveyor run.

7. The coating machine according to claim 1, wherein the rotary tumbling drum comprises a structure configured to advance or cause enhanced advancing a mixture of coating material and the food products in a direction of the discharge opening; or
   comprises internal agitator members provided at the inside of the drum wall to repeatedly lift and drop the mixture of the food products and particulate coating material, and tumbling and mixing the food products and particulate coating material, the internal agitator members comprising plates or baffles on the drum wall.

8. The coating machine according to claim 7, wherein the internal agitator members are configured to form a structure for advancing the mixture of coating material and the food products in the direction of the discharge opening.

9. The coating machine according to claim 1, wherein the elevator device comprises a mobile array of pockets adapted to receive therein coated food products having been coated, said elevator device being adapted to move said mobile array of pockets along an endless path that passes said discharge opening of the rotary tumbling drum in order to fill the coated food products and excess coating material from the rotary tumbling drum into the mobile array of pockets and that passes the receiving part of the discharge conveyor assembly to discharge the coated food products from the mobile array of pockets and supply discharged coated food products having been discharged onto said discharge conveyor assembly.

10. The coating machine according to claim 1, wherein the elevator device comprises a food product elevator wheel, comprising:
    an annular wheel body adapted to revolve about an axis of rotation by an elevator wheel drive, said annular wheel body having a central opening;
    a circumferential array of pockets in said annular wheel body, the pockets being open towards the central opening of the elevator wheel;
    wherein the elevator wheel is independent from the rotary tumbling drum, wherein an elevator wheel drive is provided arranged to set a rotary drive speed of the elevator wheel different and independent from a rotary drive speed of the rotary tumbling drum;
    wherein an independent elevator wheel drive and an independent rotary tumbling drum drive are provided to allow distinct drive speeds of the elevator wheel drive and the rotary tumbling drum.

11. A method for coating of the food products including a coating machine having an infeed conveyor assembly, a rotary tumbling drum, an elevator device and a discharge conveyor assembly, the method comprising the steps of:
    supplying the rotary tumbling drum with particulate coating material in a drum mode of said method;
    tumbling the food products and particulate coating material together about a longitudinal axis, to subject the food products to a coating treatment, wherein some of the particulate coating material adheres to the food products while a remainder of the particulate coating material is excess coating material;
    providing the rotary tumbling drum with a drum wall, an intake opening, and a discharge opening;
    arranging the infeed conveyor assembly to receive food products to be coated at an inlet of the coating machine and to convey the food products to be coated to a release end of the infeed conveyor assembly, wherein in the drum mode of the coating machine, the coating machine is arranged for dropping of the food products to be coated in the rotary tumbling drum from said release end;
    arranging the elevator device to receive a mixture of a portion of said excess coating material and coated food products from the discharge opening of the rotary tumbling drum and to supply said coated food products to the discharge conveyor assembly;
    arranging the discharge conveyor assembly to receive the food products on a receiving part of the discharge conveyor assembly and to convey the coated food products to an outlet of the coating machine, wherein in the drum mode of the coating machine, the food products are gravity fed from the elevator device;
    configuring the coating machine so that in a conveyor mode of the coating machine, a position of the release end of the infeed conveyor assembly and the receiving part of the discharge conveyor assembly is arranged to adjoin each other while extending through the rotary tumbling drum, so that food products bypass the rotary tumbling drum and the elevator device.

12. The method for coating of the food products according to claim 11, wherein in the drum mode:
    the infeed conveyor assembly is operated to convey products to be coated and to drop the food products to be coated onto the drum wall of the rotary tumbling drum,
    the rotary tumbling drum is operated to tumble and mix the food products and particulate coating material together and to advance the mixture of coating material and the food products in the direction of the discharge opening;
    the elevator device is operated to lift coated food products having been coated and drop the coated food products down by gravity, to be received by a longitudinal discharge conveyor assembly which is operated to convey the coated products; and
    wherein in the conveyor mode the infeed conveyor assembly and the discharge conveyor assembly and a temporary bridging conveyor are operated to convey the food products to be coated and the coated food products whilst extending through the rotary tumbling drum, so that the food products bypass the rotary tumbling drum and the elevator device.

* * * * *

UNITED STATES PATENT AND TRADEMARK OFFICE
CERTIFICATE OF CORRECTION

PATENT NO. : 10,966,450 B2  
APPLICATION NO. : 16/772674  
DATED : April 6, 2021  
INVENTOR(S) : Tihomir Tubic et al.

Page 1 of 1

It is certified that error appears in the above-identified patent and that said Letters Patent is hereby corrected as shown below:

In the Specification

<u>Column 5</u>  
Line 16, change "is receives" to –receives–

<u>Column 11</u>  
Line 17, change "FIG. 1" to –FIG. 6–

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*